US011609041B2

(12) United States Patent
Ben-David et al.

(10) Patent No.: US 11,609,041 B2
(45) Date of Patent: Mar. 21, 2023

(54) COOLING BATH FOR COOLING A LIQUID

(71) Applicant: WLI TRADING LIMITED, Dublin (IE)

(72) Inventors: Jonathan Ben-David, Qingdao (CN); Heung Soon Kim, Qingdao (CN)

(73) Assignee: WLI TRADING LIMITED, Dublin (IE)

( * ) Notice: Subject to any disclaimer, the term of this patent is extended or adjusted under 35 U.S.C. 154(b) by 536 days.

(21) Appl. No.: 16/604,653

(22) PCT Filed: Apr. 12, 2018

(86) PCT No.: PCT/EP2018/059453
§ 371 (c)(1),
(2) Date: Oct. 11, 2019

(87) PCT Pub. No.: WO2018/189329
PCT Pub. Date: Oct. 18, 2018

(65) Prior Publication Data
US 2021/0123670 A1 Apr. 29, 2021

(30) Foreign Application Priority Data
Apr. 12, 2017 (GB) .................................. 1705881

(51) Int. Cl.
*F25D 31/00* (2006.01)
*B67D 1/08* (2006.01)
(Continued)

(52) U.S. Cl.
CPC ......... *F25D 31/003* (2013.01); *B67D 1/0864* (2013.01); *F25C 1/12* (2013.01);
(Continued)

(58) Field of Classification Search
CPC .................................................. F25D 31/003
See application file for complete search history.

(56) References Cited

U.S. PATENT DOCUMENTS 3,484,805 A     12/1969   Lorenz
3,502,899 A  *   3/1970   Jones .................. A01J 9/04
                                                      307/118
(Continued)

FOREIGN PATENT DOCUMENTS

CN    106289038 A    1/2017
EP    3 088 878 A2   11/2016
(Continued)

OTHER PUBLICATIONS

International Search Report for International Application No. PCT/EP2018/059453, dated Jul. 20, 2018, 5pp.
(Continued)

*Primary Examiner* — Christopher R Zerphey
(74) *Attorney, Agent, or Firm* — Lewis Roca Rothgerber Christie LLP

(57) ABSTRACT

An ice bath comprising a container, a refrigeration coil for causing liquid in the container to turn to ice, a pipe for carrying liquid to be cooled by the ice bath for dispense and a plurality of conductive probes for measuring ice thickness, wherein the conductive probes are provided between at least part of the refrigeration coil and the pipe for carrying liquid to be dispensed such that a first one of the conductive probes is provided closer to the refrigeration coil at least two other conductive probes, and thereby the at least two other conductive probes are provided closer to the piping than the first conductive probe, and wherein the second and third probes are equidistant from the refrigeration coil, the ice bath further comprising means for measuring the conductance between the first probe and the second probe, the first probe and the third probe, and the second probe and the third probe.

11 Claims, 5 Drawing Sheets

(51) Int. Cl.
*F25C 1/12* (2006.01)
*F25D 21/02* (2006.01)
*G01N 1/42* (2006.01)

(52) U.S. Cl.
CPC ............... *F25D 21/02* (2013.01); *G01N 1/42* (2013.01); *F25D 2331/806* (2013.01)

(56) References Cited

U.S. PATENT DOCUMENTS

| | | | | |
|---|---|---|---|---|
| 4,008,832 | A * | 2/1977 | Rodth | B67D 1/0861 |
| | | | | 62/138 |
| 4,545,505 | A * | 10/1985 | Mueller | F25D 16/00 |
| | | | | 222/65 |
| 4,823,556 | A * | 4/1989 | Chesnut | G01N 27/06 |
| | | | | 62/201 |
| 5,502,977 | A * | 4/1996 | Ziesel | F25D 31/003 |
| | | | | 374/208 |
| 5,606,864 | A * | 3/1997 | Jones | F25D 21/02 |
| | | | | 374/21 |
| 6,374,622 | B1 * | 4/2002 | Zhang | F25D 31/003 |
| | | | | 62/139 |
| 6,662,573 | B2 * | 12/2003 | Hawkins, Jr. | B67D 1/0864 |
| | | | | 62/59 |
| 2012/0031114 | A1 | 2/2012 | Mueller et al. | |

FOREIGN PATENT DOCUMENTS

| | | |
|---|---|---|
| JP | 6-288667 A | 10/1994 |
| JP | 2003-139458 A | 5/2003 |
| JP | 2015-14441 A | 1/2015 |
| WO | WO 2014/009752 A1 | 1/2014 |

OTHER PUBLICATIONS

Written Opinion for International Application No. PCT/EP2018/059453, dated Jul. 20, 2018, 6pp.

* cited by examiner

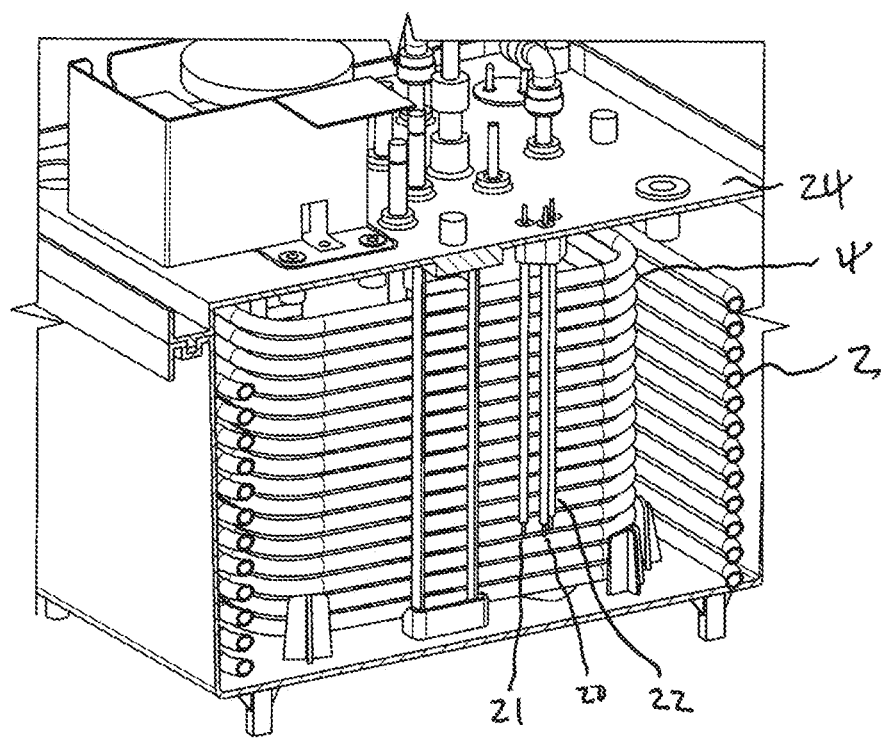
FIG. 3
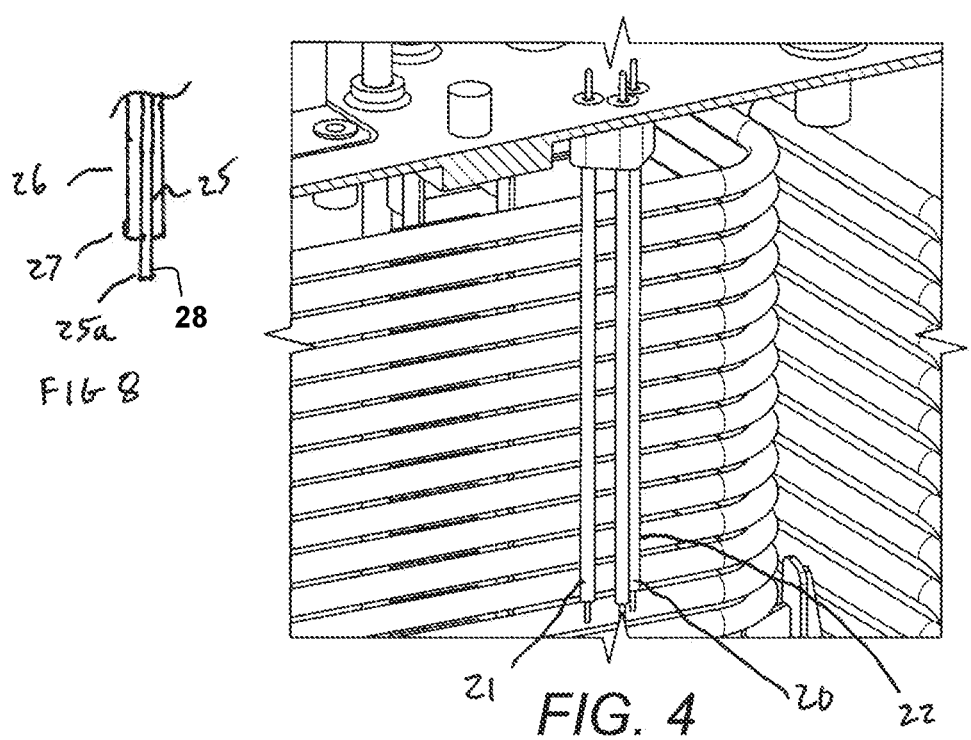
FIG. 8
FIG. 4

COOLING BATH FOR COOLING A LIQUID

CROSS-REFERENCE TO RELATED APPLICATION(S)

This application is a National Phase Patent Application of International Patent Application Number PCT/EP2018/059453, filed on Apr. 12, 2018, which claims priority of Great Britain Patent Application No. 1705881.9, filed Apr. 12, 2017. The entire contents of both of which are incorporated herein by reference.

This invention relates to an ice bath.

For the dispensing of chilled liquid, such as cold water, many different methods are used for chilling water received from an outside source before the water is dispensed. These may include cold tank systems in which water from a supply is stored in a cold tank, around which a number of refrigeration coils are wrapped. The refrigeration coils are cooled by means of a mechanical compressor and condenser system to thereby cool water within the tank for dispense.

In another type of system, a direct chilling or internal coil system is used in which the refrigeration coils are placed inside the cooling tank in direct contact with the water to be chilled. This makes for a more efficient cooling system but is more expensive to produce.

A further variation is to use an ice bath system (otherwise known as an ice bank system). An ice bath system has a container with a series of pipes running through the container which carries a liquid to be cooled and means for converting a liquid in the container into ice. The liquid to be dispensed runs through the pipes within the bath of ice and so the liquid to be dispensed does not come into contact with the ice or water within the container. The ice formed in the container serves as a cooling reservoir so that, as heat is transferred from the liquid cooling pipe, the ice is melted, generally keeping the temperature of the ice bath constant.

An ice bath system generally comprises a container, a refrigeration coil, (which is generally disposed within the container, usually towards the inner surface of the container's outside wall) and a coil of piping generally disposed within the container. This piping carries a liquid to be cooled. This may generally be either water or carbonated water in many applications.

An agitator is also provided to cause agitation of the iced water to maintain its temperature constant.

When in operation, the refrigeration system is operated which causes ice to build up around the refrigeration coils and encroach towards the pipe which holds water to be dispensed. The amount of ice created in the bath requires to be monitored or controlled. The temperature of the bath as a whole is generally controlled between fixed amounts, say between 0 to 1° C. and it is often important that the ice created in the bath does not extend so far as to physically contact or surround the pipes carrying the liquid to be cooled and dispensed, as this can cause the pipes to freeze, block or burst. Thus, a means of sensing and monitoring the amount of ice is required.

The present invention arose in an attempt to provide an improved ice monitoring system.

According to the present invention in a first aspect there is provided an ice bath comprising a container, a refrigeration coil for causing liquid in the container to turn to ice, a pipe for carrying liquid to be cooled by the ice bath for dispense and at least three conductive probes for measuring ice thickness, wherein the conductive probes are provided between the refrigeration coil and the pipe for carrying liquid to be dispensed such that a first one of the conductive probes is provided closer to the refrigeration coil than at least second and third conductive probes, and thereby said second and third conductive probes are provided closer to the piping than the first conductive probe.

Preferably, three conductive probes are provided, one of which lies closer to the evaporator or refrigeration coils than the second and third probes.

Preferably, the second and third probes are equidistant from the refrigeration coil. They may also be equidistant from the piping. The piping may be "parallel" to the refrigeration coil in the region of the probes.

The probes act together to measure conductance of the water. It is well known that the conductance of water changes in dependence upon whether the water is in the liquid or solid state and therefore by determining the conductance of water between the probes, it can be determined whether ice has reached the respective probes.

The apparatus also includes means for measuring the conductance between respective pairs of probes, i.e. between the first and second probes, the first and third probes and the second and third probes.

The three probes may be operated in sequence (i.e. in a manner such that conductance between one pair of probes may be determined, then between a second pair of probes and then between a third pair of probes, in a controlled cycle.

In a first control method during a start-up procedures, the refrigeration coils are operated and the electrical current flowing between a respective pair of probes is measured. A controller for example, a microcontroller, is arranged to use the measured values of the electrical current to determine the conductance between each pair of probes (first and second, first and third and second and third). As ice is created, it reaches the first probe and the presence of ice at the first probe (nearest to the refrigeration coils, is detected by the monitoring of the conductance between the three probes. As cooling continues, ice eventually reaches the thickness defined by the second and third probe positions and this will be measured by the conductance between the first and second and second and third, and first and third probes being monitored, thus indicating that the water has changed state from a liquid to a solid, confirming that ice has built up to at least the extent of the second and third probes.

After ice has been established then the probes together continue to monitor the conductance between them to monitor the thickness of ice during the operation of the machine.

More than three conductive probes may be used in embodiments. A minimum ice value may be set as that of a thickness which extends from the refrigeration coil to the first probe and a maximum ice value may be set at a level as an ice thickness which extends out to both the second and third probes. Means are preferably provided to turn the refrigeration on and off to control the ice thickness to be maintained between the minimum and maximum amounts.

Since the conductance of water varies with the purity of the water and, therefore, with the amount of total dissolved solids (TDS) within the water, the three probes can be used to test to monitor the TDS level of the water.

Generally, the second and third probes will be provided at an equal distance to the water cooling pipe so that measurements of the conductance between the second and third probes can be used to determine that the ice is of proper thickness.

In a further aspect, the invention provides a method of measuring ice build up in an ice bath, as above, comprising measuring conductance between the first probe and the second probe, the first probe and the third probe, and the second probe and the third probe in turn and using the measured conductance values to determine any of; when ice has reached the first probe, when ice has reached the second and third probes, and when ice has begun to recede from the second and third probes and to use the measurements to control apparatus for causing ice to be generated.

Embodiments of the invention will now be described, by way of example, only, with reference to the accompanying drawings in which;

FIG. 3 is a partly cut-away view of a water bath with an arrangement of ice thickness probes;

FIG. 4 shows part of FIG. 3 expanded;

FIG. 8 shows part of a conductive probe.

Figure 1:
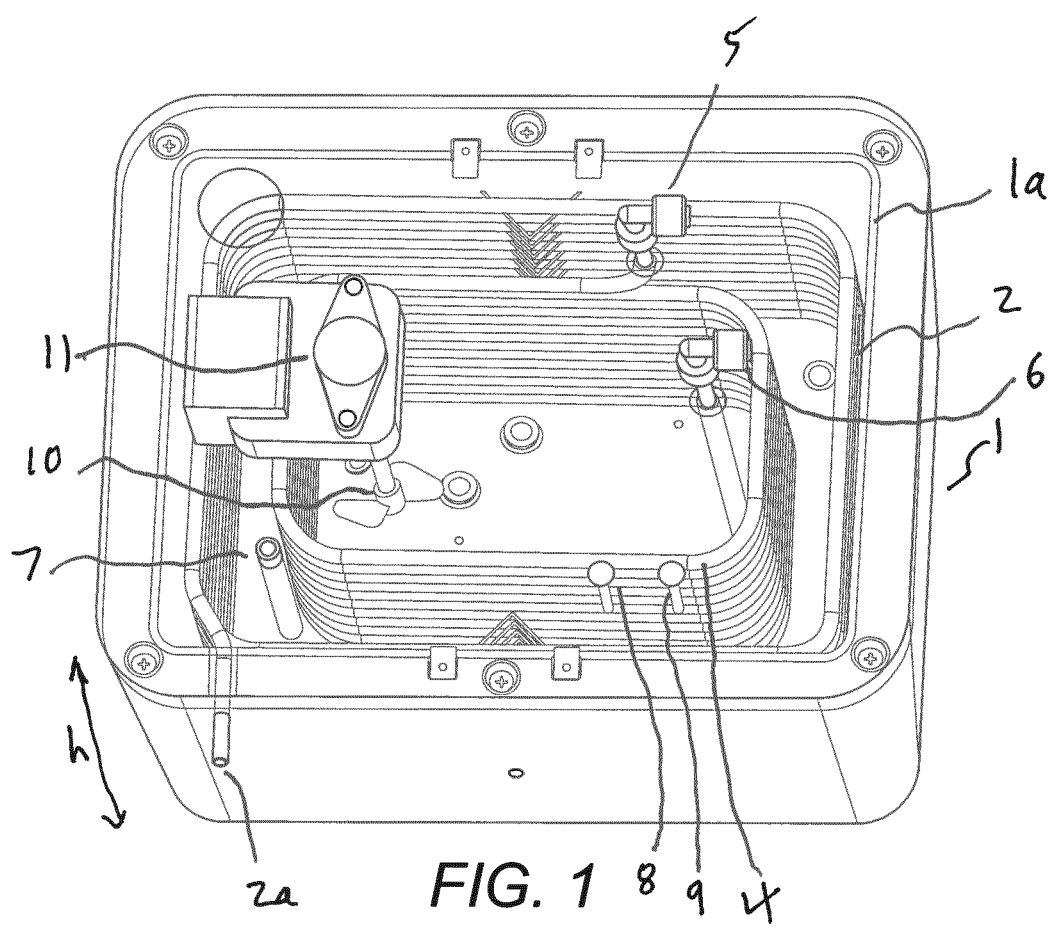
FIGS. 1 and 2 show typical water baths.
Figure 2:
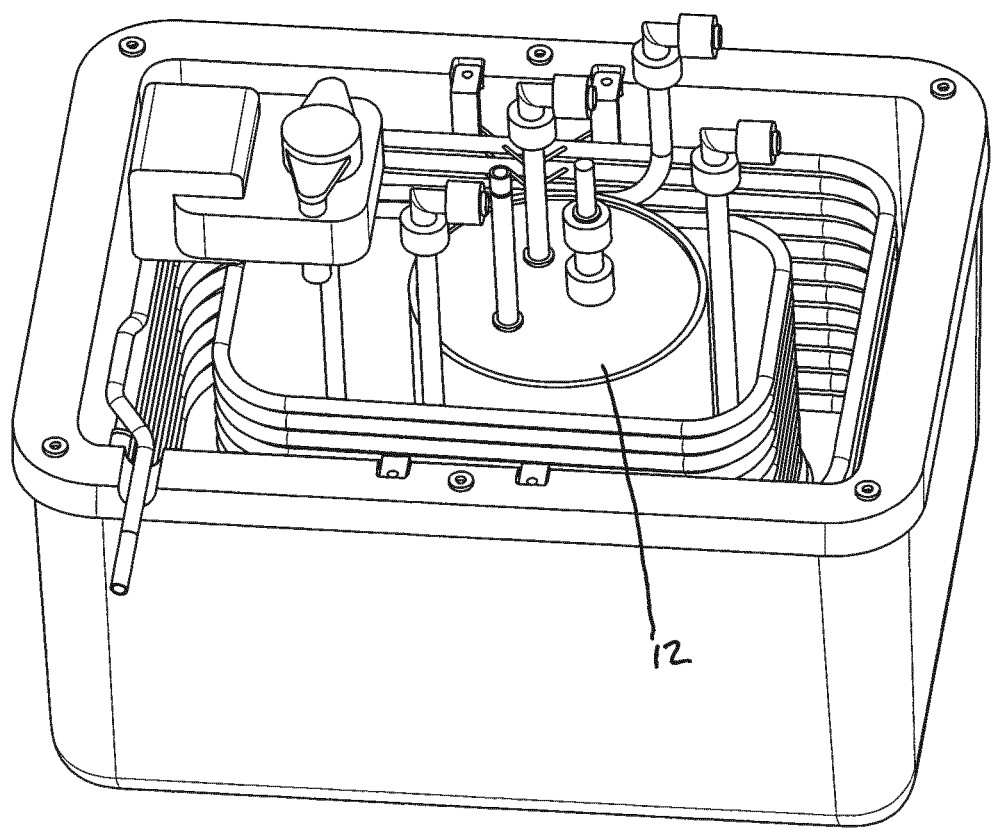

Referring to FIGS. 1 and 2, a typical ice bath system includes a container or vessel 1 which is typically of a plastics or metal material. One or more refrigeration coils are provided within the container, generally relatively close to the inner wall to the container and are generally wound in a vertical manner to cover most of the height of the container. These receive a refrigerant liquid (not shown) through an inlet 2a and an outlet (not shown). A suitable refrigerant liquid is applied to the refrigerant coils. The refrigeration coils may otherwise be known as evaporator coils. Evaporators and refrigerant coils and suitable liquids are well known in many fields such that of refrigerators.

Lying generally within the area defined by the refrigerant coils is a coiled pipe for drinking liquid. This, like the refrigerant coils, may be coiled several times to rise up the height of the container and receives the fluid to be dispensed (e.g. water) from an inlet 5. After passing through the pipe the liquid passes through outlet 6 to a dispense outlet or faucet from which the chilled water or other fluid is to be dispensed. Typically, the inlet is provided at the top most part of the pipe 4, and the water to be chilled goes around the coils and to the bottom part of the coil from where it rises to the outlet 6 for dispense.

Water or other liquid such as ethylene glycol, is provided within the container such that it is acted upon by the refrigerant in the refrigeration coil in order to turn the water partially into ice and, as the pipe for the drinking liquid is contained within the bath, this is acted upon by the iced water to cool liquid within it. Thus, the liquid when it has passed through the pipe is chilled but never contacts the water or other liquid used to chill it.

A temperature sensor 7 may be provided for determining the temperature of the water/ice within the container. The figure also shows level sensors 8, 9, for automated filling of the container. These sense the pressure of water by changes in resistance from high (no water) to lower (no water). Instead, other level sensors may be used, like a float switch. Thus, the water or other fluid which is provided within a container and which is used to form the ice bath may be kept at a constant level by monitoring a level sensor which is activated to turn off the valve of a filling mechanism when the container is full. The ice bath may include an impeller 10 powered by an electric motor driver 11. The impeller causes agitation of the water to ensure that the water is evenly distributed and also to prevent ice build up where it is not needed. This ensures that the temperature across the extent of the ice bath remains generally constant.

FIG. 2 shows a similar ice bath but in this case a carbonation tank 12 is provided. Water within the carbonation tank which also has inlets and outlets is carbonated by means of injected carbon dioxide or otherwise and this is mounted within the ice bath so as to be chilled by the ice bath such that the user can select between still and carbonated (sparkling) chilled water or other liquid. The present invention is equally applicable to still or sparkling systems, or ones which can selectively dispense both.

As described above, in such ice baths the container is filled with water, or perhaps with other heat transfer liquids, either manually or automatically in a system which includes level sensors and a valve. Such level sensors may be electronic or mechanical. The refrigeration system is then operated, causing ice to build up around the refrigeration coils in the case of water, or to generally cool the heat transfer liquid to a desired temperature. The amount of ice created in the bath is generally controlled by means of either a mechanical thermostat or an electronic thermostat or sensor to be controlled between minimal and maximum values which are typically 0 and 1 degree Celsius. It is important the ice created does not surround the pipe carrying the liquid to be cooled and dispensed, as this may cause the pipes to freeze and other damage or poor quality dispense.

In embodiments, this is achieved by means of ice thickness probes, and an example of these is shown in the FIGS. 3 to 7. Three probes 20, 21 and 22 are shown in each figure. As shown, each probe extends generally vertically from a position where it is supported by a lid 24 of the container and hangs vertically downwards. Each probe comprises a central conductor 25 mounted within a co-axial sheath 26, as shown in FIG. 8. The bottommost end 28 of the conductor extends beyond the bottom most part 27 of the sheath. At the top end, the conductor also projects beyond the sheath for collection to a controller (not shown) which is used to provide current to the probes and to measure the results.

As is shown in the figures, the probes are mounted between the pipe 4 and the refrigeration coils 2. They are also mounted in such a way that probe 20 is mounted nearer to coil 2 than the other probes. That is, the closest distance of probe 20 to the closest part of the refrigeration coils 2 is closer than the closest distance of either of probes 21 and 22 to the refrigeration coils 2. Probes 21 and 22 are, therefore, mounted closer to the pipe 4 for carrying the fluid to be chilled than is the probe 20. In some embodiments, probes 21 and 22 are both spaced the same distance from the pipe 4. Generally, as shown, the coils will have a generally rectangular shape with straight portions running alongside the edges of the rectangular container and curved parts at the coils of the container. The probes are generally mounted along one of the longer edges such that probe 20 is closer to refrigeration coil 2 than probes 21 and 22 and probes 21 and 22 are equidistant from pipe 4 and also from pipe 2.

FIG. 4 is enlarged compared to FIG. 3 and shows the arrangement of the probes more clearly. The probes are arranged such that the exposed bottom edges 25a are a distance above the housing such that the conductance of water/ice at that point can be measured.

The respective probes therefore act as electrodes.

Figure 5:
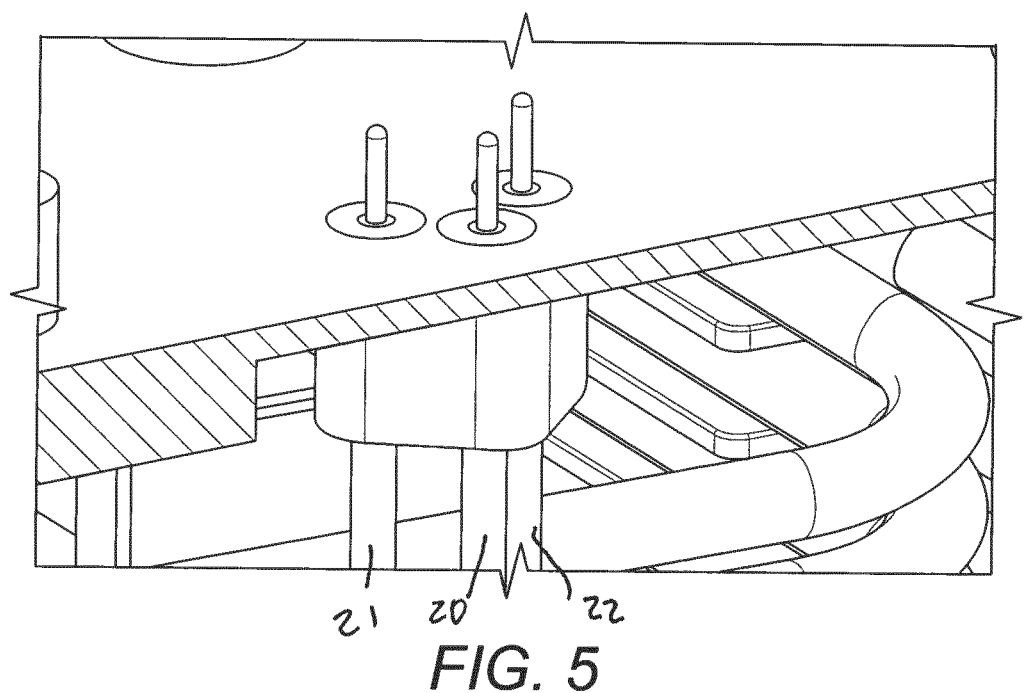
FIG. 5 shows an expanded part of a top part of FIG. 3.

FIG. 5 shows an enlarged detail of the top part of the probe assembly clearly showing how probe 20 sits closer to the outside of the container than the other two probes.

Figure 6:
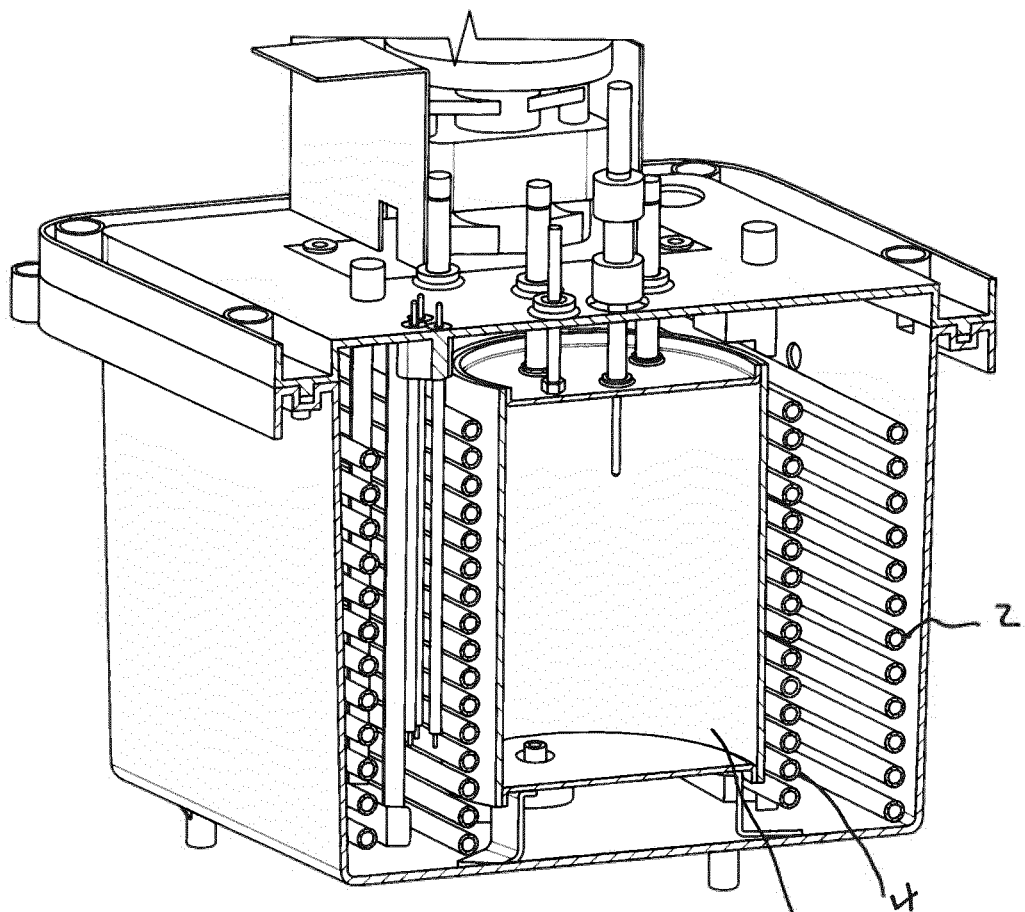
FIG. 6 shows a cut-away part.

FIG. 6 shows a more cut away version illustrating a carbonation tank 30.

This sits within the pipe coils 4.

An agitator may or may not be present in embodiments of the invention.

Figure 7:
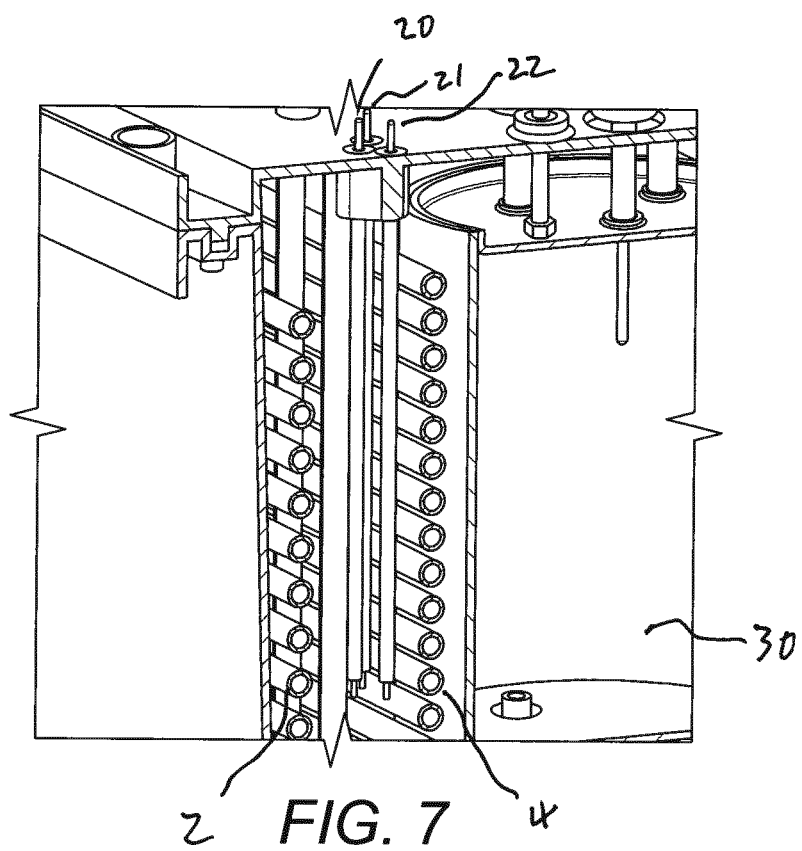
FIG. 7 shows a detail of part of the cut away part.

FIG. 7 shows an alternative view clearly showing the probes sitting between the refrigerant coils 2 and the pipe for liquid to be dispensed 4 with probe 20 closer to the refrigerant coils than the other two probes.

Turning now to the apparatus in use, firstly the container is filled with water or other freezable liquid. A refrigerant is supplied into the refrigerant/evaporation coils 2. At the beginning of a cooling cycle, when it is desired to create ice, the conductance of the water is measured by the three probes working together. Conductance is measured between probe 20 and probe 21, probe 20 and probe 22 and between probe 21 and probe 22. This establishes a base line conductance of the water and is done before ice is formed or at least before any substantial ice is formed.

Conductance values are measured by applying voltage signals between the respective pairs of probes in turn and measuring the signal attenuation. This can, therefore, measure the conductance of the water between the exposed portions of the probes which will vary as the water turns to ice. Typically, the probes may be powered by a DC signal and are powered alternately, so that the relative conductance from one to another, and between different pairs, may be determined, e.g. first the conductance between probes 20 and 21, then that between probes 20 and 22, then that between probes 21 and 22. This cycle can be repeated.

The electrical signal strength is measured and conductance determined through the use of an algorithm. Algorithms for determining conductance from signal strength are well known, for example, correlating attenuation of a DC signal strength to an expected conductance. A micro controller is generally used for this or other type of controller, whether DC or otherwise.

As ice is created, this begins at the surface of the evaporator or refrigerator coils 2. As it builds up it reaches the first probe 20 and presence of the ice at probe 20 is detected through monitoring of the conductance between probes 20 and 21, and between probes 20 and 22. The conductance will begin to change as ice builds upon probe 20.

Cooling then continues until ice reaches the thickness defined by the positions of the second and third positions of the probes, i.e. extends to these probes. Thus, the second and third probes are most preferably mounted at the position between the refrigeration coils and the dispense pipe where ice is allowed to extend to. When ice reaches probes 21 and 22 (which it will be recalled will generally be equidistant from the refrigeration coils) then the conductance between the three sets of probes changes. This changing conductance shows that the water has changed state from a liquid to a solid, i.e. ice. This can then be detected and used to turn off the cooling.

After this first cooling cycle has been completed, then the probes continue to monitor the conductance between them. This continues to monitor the thickness of the ice during the operation. As ice begins to melt and to recede away from the dispense pipe, a point will be reached when ice is no longer around probes 21 and 22 and this will be detected by a changing conductance. The refrigeration mechanism can then be turned on again to include the amount of ice and this can be repeated so as to keep the amount of ice steady and within controllable limits.

In another embodiment, the ice may be allowed to recede past probe 20 before the compressor (refrigerator mechanism) is turned back on again. This is to reduce the number of compressor on and off signals, and to reduce the number of short cycles of the compressor.

The thickness of ice may be monitored continually during the operation of the machine or may be monitored when the machine is powered on but in a stand-by mode for example.

During operation of the dispense machine, if the second and third probes 21 and 22 become exposed to liquid water, i.e. ice has melted and the thickness begins to recede, this is detected by the microprocessor or microcontroller monitoring a change in conductance. This is used as signal to turn the cooling system on to replace lost ice thickness. Ice will be lost through heat transfer to the surrounding environment, thus ice thickness may be continually monitored by embodiments of the invention so that cold water delivery is maximised.

The use of three probes is desirable to properly monitor that ice has extended the allowed distance towards the dispense pipe. If only one second probe were present then this might monitor a spike of localised variation in ice thickness and not an overall creation of ice in a desired direction. Thus, embodiments within the invention preferably use three probes at least. More than three probes may be used in some environments. For example, in addition to a first probe which is closest to the refrigeration coil, three or more probes may be used further away from the refrigeration coil in order to measure evenness of ice distribution more thoroughly.

In addition, the three probe structure can be used to measure the level of TDS (total dissolved solids) in the water and measurements between all three probes (i.e. probe 20 to probe 21, probe 20 to probe 22 and between probes 21 and 22) is very useful to achieve a reliable measurement of TDS level, and distinguish this from single ice thickness measurement.

By ensuring that the two probes closest to the water cooling coils are disposed generally in parallel to these coils then these are able to check that ice is being built up to the desired thickness.

Many control methods can be used by which the level of ice can be measured and controlled. A compressor is used to control flow of the refrigerant and thus control the temperature. The controlling unit can provide instructions to the compressor to turn on and off as appropriate to maintain the level of ice constant and, therefore, maintain the temperature of the ice bath constant at the cooling pipes. It can also be used to control an agitator or impeller where this is used.

It may be useful to include more than three probes. If three or more probes are arranged closer to the piping for carrying liquid to be dispensed than a fourth probe, then a user can check there is an even ice thickness, by spacing these apart from each other.

The refrigeration coils, and pipe for carrying liquid to be dispensed can be positioned otherwise than as shown. Whatever their disposition, the probes should be between them with at least one probe nearer the refrigeration coil than others.

The invention claimed is:

1. An ice bath comprising a container, a refrigeration coil for causing liquid in the container to turn to ice, a pipe for carrying liquid to be cooled by the ice bath for dispense and at least three conductive probes for measuring ice thickness, wherein the conductive probes are provided between the refrigeration coil and the pipe for carrying liquid to be dispensed such that a first one of the conductive probes is provided closer to the refrigeration coil than at least second and third conductive probes, and thereby said second and third conductive probes are provided closer to the piping than the first conductive probe, wherein the second and third probes are equidistant from the refrigeration coil, and wherein the at least three conductive probes are oriented parallel to an axis of the refrigeration coil, the ice bath further comprising means for measuring the conductance between the first probe and the second probe, the first probe and the third probe, and the second probe and the third probe.

2. An ice bath as claimed in claim 1 wherein the at least three conductive probes comprises exactly three conductive probes.

3. An ice bath as claimed in claim 1, wherein the container has side walls, the refrigeration coil lying closer to the side walls than the piping carrying liquid to be dispensed and wherein the conductive probes are mounted between the refrigeration coil and the piping.

4. An ice bath as claimed in claim 1, wherein the piping is provided in the form of a coil.

5. An ice bath as claimed in claim 1, wherein the second and third probes are also equidistant from the pipe for carrying liquid to be dispensed.

6. An ice bath as claimed in claim 1, wherein the at least three conductive probes further comprises a fourth conductive probe, the first probe being closer to the refrigeration coil than the second, third, and fourth probes.

7. An ice bath as claimed in claim 1, wherein the means for measuring the conductance is arranged to measure the conductance between each respective pair of probes in turn.

8. An ice bath as claimed in claim 1, wherein DC current is applied to the probes in turn by a controller in order to measure conductance between respective pairs of probes.

9. A method of measuring ice build up in an ice bath as claimed in claim 1, comprising measuring conductance between the first probe and the second probe, the first probe and the third probe, and the second probe and the third probe in turn and using the measured conductance values to determine any of; when ice has reached the first probe, when ice has reached the second and third probes, and when ice has begun to recede from the second and third probes and to use the measurements to control apparatus for causing ice to be generated.

10. A method as claimed in claim 9 wherein a minimum ice value is set as that of a thickness which extends from the refrigeration coil to the first probe, and a maximum ice value is set a level of an ice thickness which extends to both the second and third probes and controlling icing to keep the amount of ice within the liquid within the container between the minimum and maximum levels.

11. An ice bath apparatus as claimed in claim 1, further arranged to measure total dissolved solids within a liquid within the container based on the conductance measured between the first probe and the second probe, the first probe and the third probe, and the second probe and the third probe.

* * * * *